(12) United States Patent
Anglin et al.

(10) Patent No.: US 12,203,382 B1
(45) Date of Patent: Jan. 21, 2025

(54) BEARING OIL DISTRIBUTION SCHEME

(71) Applicant: RTX CORPORATION, Farmington, CT (US)

(72) Inventors: Christopher T. Anglin, Manchester, CT (US); Kiomarys Mariel Toro, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/382,671

(22) Filed: Oct. 23, 2023

(51) Int. Cl.
  *F01D 25/18* (2006.01)
  *F01D 25/16* (2006.01)
  *F16C 33/66* (2006.01)

(52) U.S. Cl.
  CPC .......... *F01D 25/18* (2013.01); *F01D 25/162* (2013.01); *F16C 33/6677* (2013.01); *F05D 2220/323* (2013.01); *F05D 2240/61* (2013.01)

(58) Field of Classification Search
  CPC .. F01D 25/18; F01D 25/162; F05D 2220/323; F05D 2240/61; F16C 33/6677
  See application file for complete search history.

(56) References Cited

U.S. PATENT DOCUMENTS

| | | | |
|---|---|---|---|
| 10,174,634 B2 | 1/2019 | Pikovsky et al. | |
| 11,268,573 B2 | 3/2022 | Lefebvre et al. | |
| 11,692,482 B2 | 7/2023 | Hicks | |
| 2016/0376947 A1* | 12/2016 | Lucas | F16C 3/02 29/888.011 |
| 2017/0145857 A1* | 5/2017 | Pikovsky | F01M 11/02 |
| 2018/0058330 A1* | 3/2018 | Munevar | F02K 3/06 |
| 2020/0141444 A1* | 5/2020 | Thatte | F16C 17/08 |
| 2023/0077003 A1* | 3/2023 | Perdrigeon | F16C 33/6677 |

FOREIGN PATENT DOCUMENTS

| | | | | |
|---|---|---|---|---|
| CN | 107795381 A | * | 3/2018 | ............... F02C 7/06 |
| CN | 107795381 B |   | 3/2019 | |
| CN | 213235142 U | * | 5/2021 | ............... F02C 7/06 |
| CN | 112762133 B |   | 9/2021 | |

OTHER PUBLICATIONS

English Translation CN-107795381-A (Year: 2018).*
English Translation CN-213235142-U (Year: 2021).*

* cited by examiner

*Primary Examiner* — Shafiq Mian
(74) *Attorney, Agent, or Firm* — Carlson, Gaskey & Olds, P.C.

(57) ABSTRACT

A turbine engine assembly includes a shaft rotatable about an engine axis, the shaft includes slots that are formed on an outer surface and passages between an inner cavity to the outer surface, and a bearing assembly that is configured to support rotation of the shaft. The bearing assembly includes an inner race that is supported on the outer surface of the shaft over the slots. At least one bearing member is supported in the inner race, an outer race, a first cover that is disposed on a forward side of the inner race and a second cover that is disposed on an aft side of the inner race. Each of the first cover and the second cover include radially extending grooves for communicating lubricant from the slots to the bearing member.

15 Claims, 6 Drawing Sheets

BEARING OIL DISTRIBUTION SCHEME

STATEMENT REGARDING FEDERALLY SPONSORED RESEARCH OR DEVELOPMENT

This invention was made with Government support awarded by the United States. The Government has certain rights in this invention.

BACKGROUND

A gas turbine engine includes bearing assemblies that support rotation of various engine shafts. Bearings typically include a bearing member supported between a fixed ring and a rotating ring. Lubricant is communicated to the bearing member through passages in the rotating ring. The passages through the rotating ring can create areas of stress concentration that may limit load capacity and longevity of the bearing.

Turbine engine manufacturers continue to seek improvements to performance that increase thermal, transfer and propulsive efficiencies.

SUMMARY

A turbine engine assembly according to an exemplary embodiment of this disclosure, among other possible things includes, a shaft rotatable about an engine axis, the shaft includes slots that are formed on an outer surface and passages between an inner cavity to the outer surface, and a bearing assembly that is configured to support rotation of the shaft. The bearing assembly includes an inner race that is supported on the outer surface of the shaft over the slots. At least one bearing member is supported in the inner race, an outer race, a first cover that is disposed on a forward side of the inner race and a second cover that is disposed on an aft side of the inner race. Each of the first cover and the second cover include radially extending grooves for communicating lubricant from the slots to the bearing member.

In a further embodiment of the foregoing turbine engine assembly, the inner race includes a forward land and an aft land and the bearing member is disposed between the forward land and the aft land of the inner race.

In a further embodiment of any of the foregoing turbine engine assemblies, the inner race includes a bearing surface that is disposed between the forward land and the aft land. The bearing surface includes a continuous uninterrupted circumferential surface.

In a further embodiment of any of the foregoing turbine engine assemblies, the inner race includes an inner circumferential surface that is disposed over the slots on the shaft. The inner circumferential surface is uninterrupted.

In a further embodiment of any of the foregoing turbine engine assemblies, the forward side and the aft side of the inner race include a lower portion that is transverse to the outer surface of the shaft and an upper portion that is angled inward toward the bearing member.

In a further embodiment of any of the foregoing turbine engine assemblies, each of the first cover and the second cover include a bottom portion that is abutted against the corresponding lower portion of the forward side and the aft side and a top portion. A spacing between the top portion of the first and second covers and a corresponding upper portion of the forward and aft sides of the inner race provides for communication of lubricant from the radially extending grooves toward the bearing member.

In a further embodiment of any of the foregoing turbine engine assemblies, the slots formed on the outer surface of the shaft have an axial length that is greater than an axial width of the inner race.

In a further embodiment of any of the foregoing turbine engine assemblies, each of the first cover and the second cover overlap a portion of the slots or a portion of the passages between the inner cavity and the outer surface.

In a further embodiment of any of the foregoing turbine engine assemblies, the slots are circumferentially spaced apart, begin at a common axial location and are of a common axial length.

In a further embodiment of any of the foregoing, the turbine engine assembly includes a fastening member that is securable to the shaft for holding the bearing assembly at an axial location on the outer surface of the shaft.

In a further embodiment of any of the foregoing, the turbine engine assembly includes a lubrication system that is configured to communicate lubricant to the inner cavity of the shaft.

A gas turbine engine according to another exemplary embodiment of this disclosure, among other possible things includes, a fan that includes a plurality of fan blades rotatable about an axis, a compressor section, a combustor that is in fluid communication with the compressor section, a turbine section that is in fluid communication with the combustor, a shaft that couples a portion of the turbine section to at least one of the fan and a portion of the compressor section. The shaft includes slots that are formed on an outer surface and passages between an inner cavity and the outer surface. A bearing assembly is configured to support rotation of the shaft. The bearing assembly includes an inner race that is supported on the outer surface of the shaft over the slots. At least one bearing member is supported in the inner race, an outer race, a first cover that is disposed on a forward side of the inner race and a second cover disposed on an aft side of the inner race. Each of the first cover and the second cover include radially extending grooves for communicating lubricant from the slots to the bearing member. A lubrication system communicates a lubricant flow to the bearing assembly through the inner cavity of the shaft.

In a further embodiment of the foregoing turbine engine assembly, the inner race includes a forward land and an aft land and the bearing member is disposed between the forward land and the aft land of the inner race.

In a further embodiment of any of the foregoing turbine engine assemblies, the inner race includes a bearing surface that is disposed between the forward land and the aft land and an inner circumferential surface that is disposed over the slots on the shaft. Each of the bearing surface and the inner circumferential surface include continuous uninterrupted circumferential surfaces.

In a further embodiment of any of the foregoing turbine engine assemblies, each of the first cover and the second cover include a bottom portion that is abutted against the corresponding one of the forward side and the aft side of the inner race and a top portion that is spaced apart from the corresponding one of the forward side and the aft side to define a passage for communication of lubricant from the radially extending grooves toward the bearing member.

In a further embodiment of any of the foregoing turbine engine assemblies, the slots formed on the outer surface of the shaft have an axial length that is greater than an axial width of the inner race and each of the first cover and the second cover overlap a portion of the slots.

In a further embodiment of any of the foregoing turbine engine assemblies, the slots are circumferentially spaced apart, begin at a common axial location and are of a common axial length.

A bearing assembly for supporting a rotatable shaft of an aircraft engine according to another exemplary embodiment of this disclosure, among other possible things includes, an inner race that is configured for assembly over slots that are formed on an outer surface of a shaft, at least one bearing member that is supported in the inner race, an outer race that is configured for assembly to an engine static structure, a first cover that is disposed on a forward side of the inner race, and a second cover that is disposed on an aft side of the inner race. Each of the first cover and the second cover include radially extending grooves that define a portion of a lubricant pathway to the bearing member.

In a further embodiment of the foregoing bearing member, the inner race includes a bearing surface that is disposed between a forward land and an aft land and an inner circumferential surface. Each of the bearing surface and the inner circumferential surface include continuous uninterrupted circumferential surfaces.

In a further embodiment of any of the foregoing bearing assemblies, each of the first cover and the second cover include a bottom portion that is abutted against the corresponding one of the forward side and the aft side of the inner race and a top portion that is spaced apart from the corresponding one of the forward side and the aft side to define a passage for communication of lubricant from the radially extending grooves toward the bearing member.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
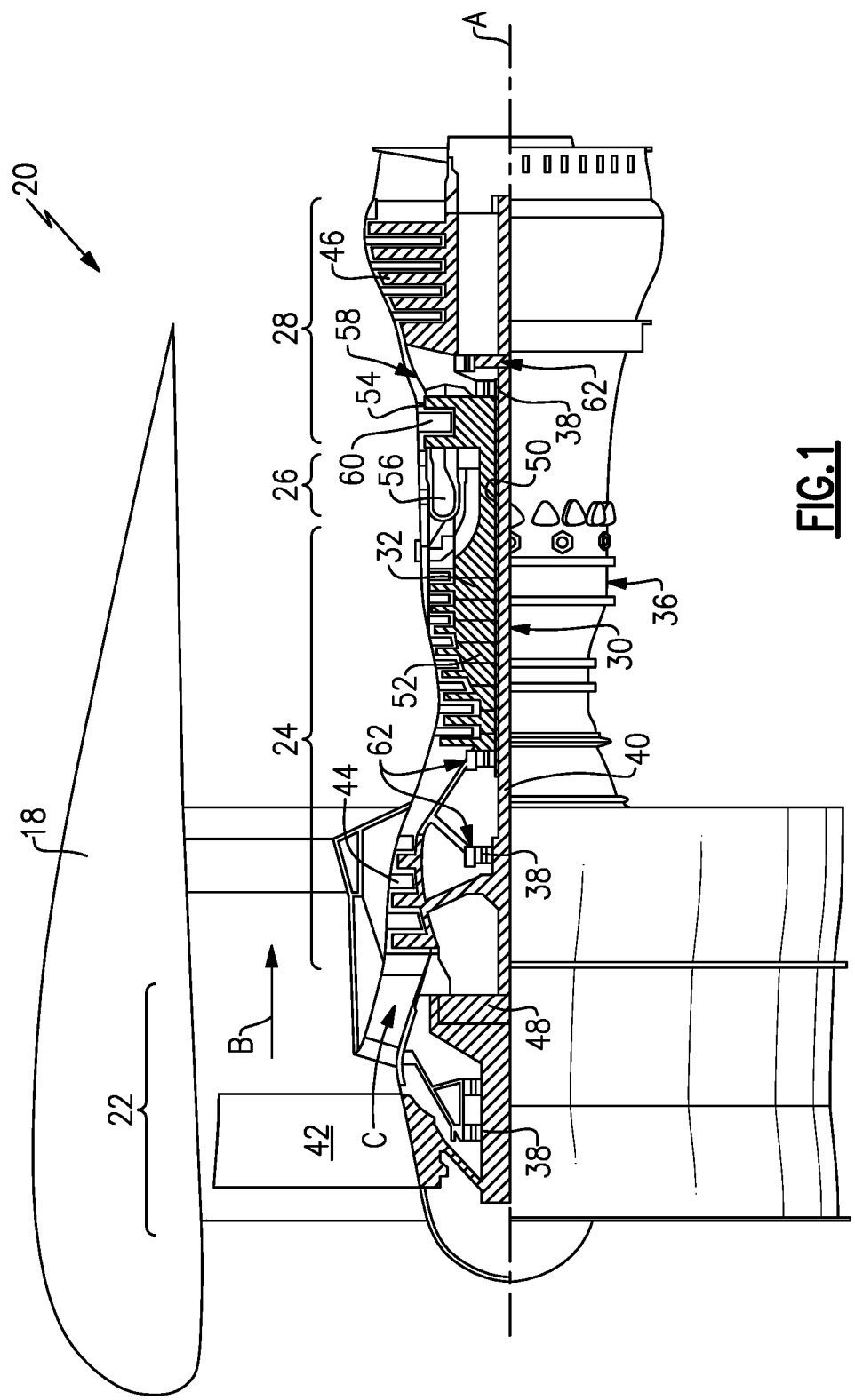
FIG. 1 is a schematic view of an example gas turbine engine.

FIG. 1 schematically illustrates a gas turbine engine 20. The example engine 20 includes bearing assemblies with features that provide lubricant to bearing members without passages through a supporting inner race to eliminate areas of stress concentration and improve strength and longevity.

The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with turbofan engines as the teachings may be applied to other types of aircraft engine architectures.

The exemplary engine 20 generally includes a low speed spool 30 and a high speed spool 32 mounted for rotation about an engine central longitudinal axis A relative to an engine static structure 36 via several bearing systems 38. A bearing assembly 62 is shown and supports rotation of an inner shaft 40. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
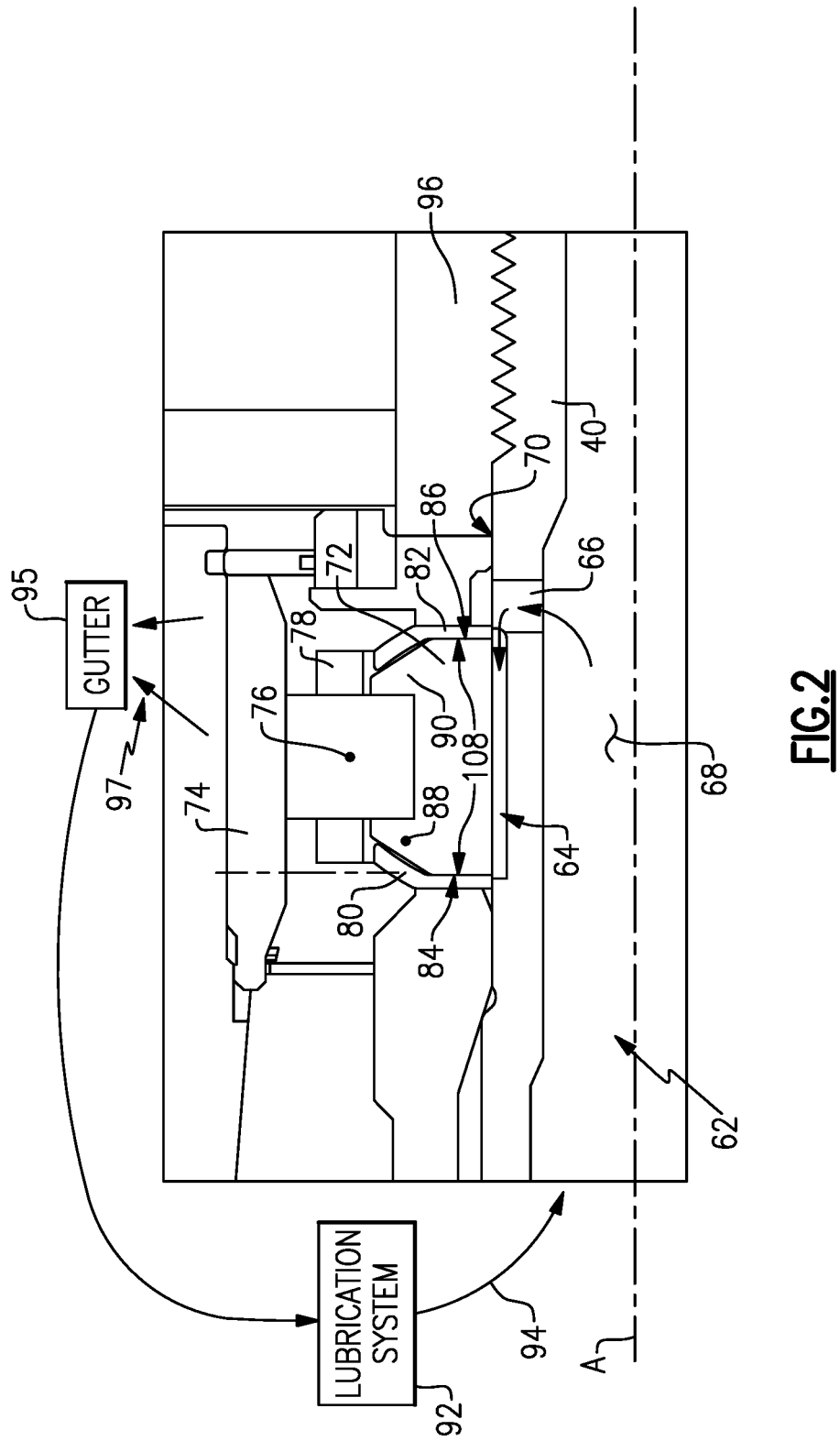
FIG. 2 is a schematic view of an example bearing assembly.
Figure 3:
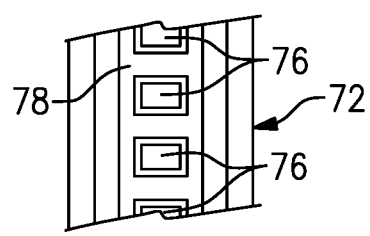
FIG. 3 is a top schematic view of a portion of the example bearing assembly.

Referring to FIG. 2 with continued reference to FIG. 1, the bearing assembly 62 is shown schematically and includes features that provide lubricant flow to a rotating bearing member 76 without openings or passages through an inner race 72. The other bearing systems 38 indicated schematically in FIG. 1 may be configured in the same manner as the example bearing assembly 62 embodiment shown and described.

A lubricant system 92 provides a lubricant flow 94 to an inner cavity 68 of the shaft 40 that is communicated into the bearing assembly 62. Exhausted lubricant 97 is captured in a gutter system 95 and communicated back the lubricant system 92 for recirculation.

The bearing assembly 62 includes the inner race 72 that is rotating with the rotating shaft 40. Rotating bearing member 76 is disposed between the inner race 72 and a fixed outer race 74. The inner race 72 is disposed over slots 64 formed on an outer surface 70 of the shaft 40. Passages 66 are provided through the shaft 40 to communicate lubricant from an inner cavity 68 to the slots 64.

A first cover 80 is abutted against an axially forward side 84 of the inner race. A second cover 82 is abutted against an axially aft side 86 of the inner race 72. Each of the covers 80, 82 overlap a portion of the slot 64 defined on the shaft 40. The inner race 72 further includes a forward land 88 and an aft land 90 between which the bearing member 76 is supported. A fastening member 96 is attached to the shaft 40 and holds the bearing assembly 62 at a fixed axial location on the outer surface 70 of the shaft 40. In one example embodiment, the fastening member 96 is attached by way of threaded interface with a portion of the shaft 40 and abuts the second cover 82. Although the fastening member 96 is shown by way of example, other fastening configurations could be utilized and are within the contemplation of this disclosure.

Figure 4:
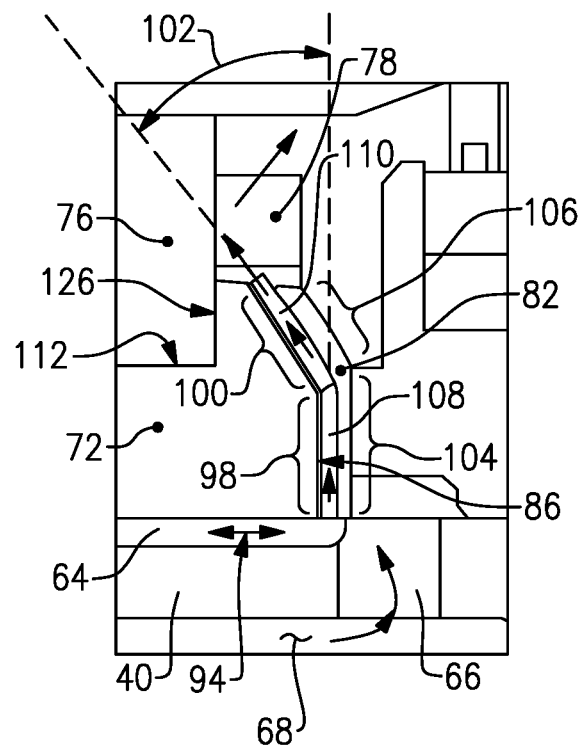
FIG. 4 is an enlarged schematic view of a portion of the example bearing assembly.

Referring to FIG. 4, with continued reference to FIG. 2, a bearing cage 78 is disposed around the bearing member 76 to provide and maintain a circumferential spacing between multiple bearing members 76. Multiple bearing members 76 would be provided about the circumference of the shaft 40 within the race 72. The number and size of bearing members 76 may vary to accommodate application specific requirements.

Referring to FIG. 4, with continued reference to FIGS. 2 and 4, lubricant 94 from a lubrication system is communicated into the inner cavity 68 of the shaft 40 and through the passages 66 to the outer surface 70 of the shaft 40. Specifically, lubricant is communicated through the passages 66 into the slots 64. The slots 64 communicate lubricant to the forward side 84 and aft side 86 of the inner race 72. The first and second covers 80, 82 include radially extending grooves 108 through which lubricant flow is communicated radially outward from the axis A.

The second cover 82 is shown by way of example for features that are included in both the first cover 80 and the second cover 82. The second cover 82 includes a bottom portion 104 and a top portion 106. The forward side 86 includes a lower portion 98 and an upper portion 100. The lower portion 98 is arranged perpendicular to the axis A. The second cover 82 overlaps a portion of the slot 64 on the shaft 40.

The upper portion 100 is angled inward toward the bearing member 76. In one disclosed example, the upper portion 100 is angled inward an angle 102 that is between 40 and 60 degrees relative to the lower portion 98. The angle 102 is set to provide for the communication of lubricant to the bearing member 76 and may differ than the example disclosed angle and remain within the contemplation and scope of this disclosure.

The second cover 82 includes a top portion 106 that is disposed at an angle that corresponds to the angle 102 and spaced apart from the upper portion 100 of the race 72. The spacing between the upper portion 100 of the inner race 72 and the top portion 106 of the second cover 82 define a lubricant passage 110. Lubricant is expelled through the passage 110 toward the bearing member 76. Lubricant communicated to the bearing member 76 is communicated to contact surfaces between the bearing member 76 and surfaces of the race 72. The contact surfaces include an inner surface 126 of each of the lands 88, 90, a radial bearing surface 112 and the outer race 74.

Figure 5:
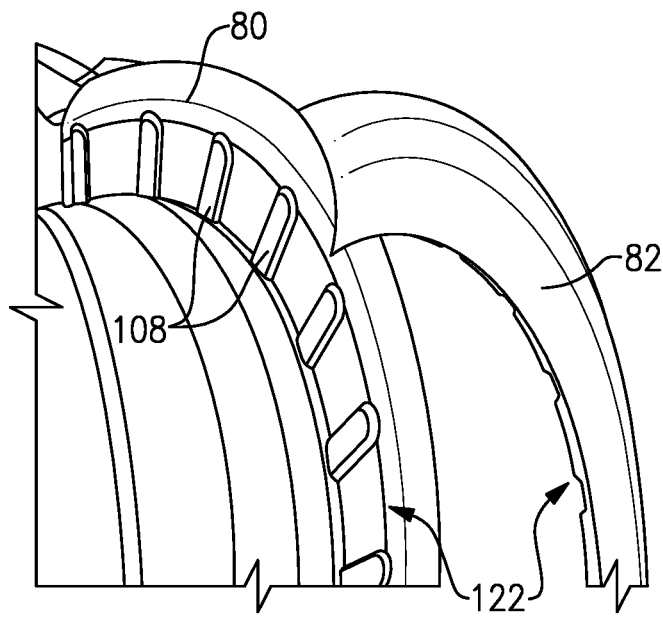
FIG. 5 is an axial view of a portion of one of the first and second covers of the bearing assembly.
Figure 6:
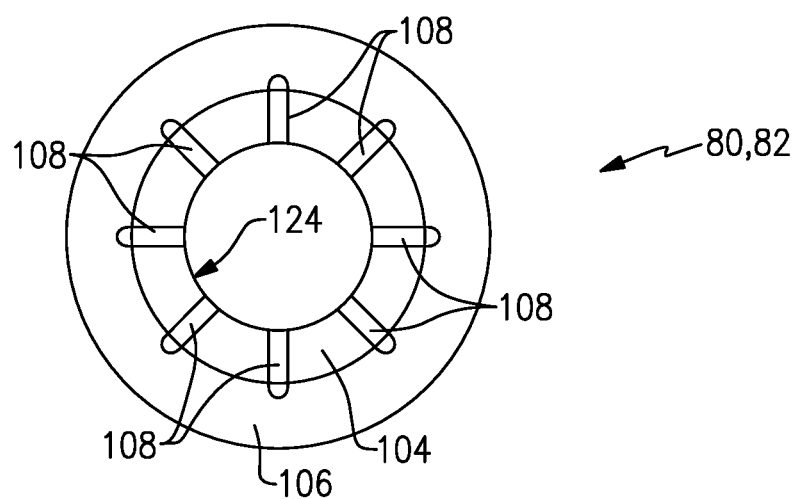
FIG. 6 is a schematic view of example first and second covers of the bearing assembly.

Referring to FIGS. 5 and 6, with continued reference to FIG. 4, the first and second covers 80, 82 are full round parts that include inner surface 122 with the grooves 108. The grooves 108 open into an inner diameter 124 and extend radially outward to the upper portion 106. Opening to the inner diameter 124 provides for lubricant communication from the slots 64 disposed on the shaft 40. The number and size of the grooves 108 are determined to provide sufficient lubricant flow to the bearing member 76.

Figure 7:
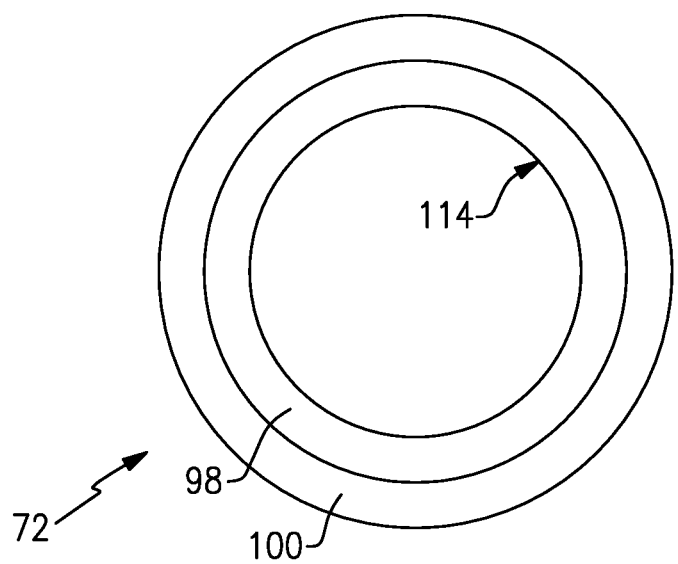
FIG. 7 is a side view of an example inner race of the bearing assembly.
Figure 8:
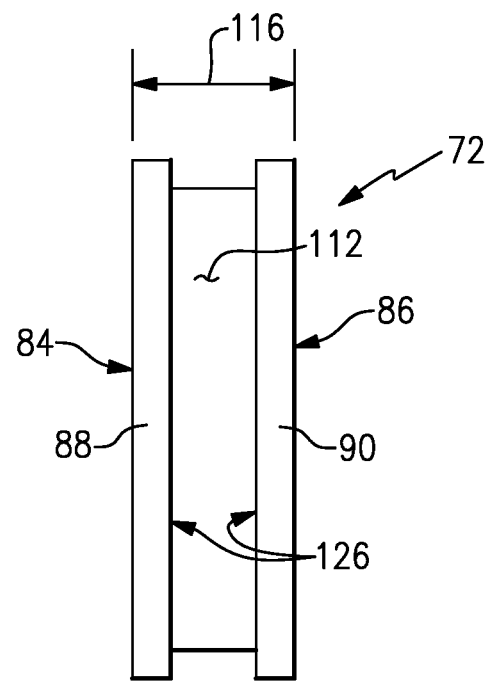
FIG. 8 is a side view of the example inner race of the bearing assembly.

Referring to FIGS. 7 and 8 with continued reference to FIG. 4, the inner race 72 is one-piece integral part. The inner race 72 includes an inner circumferential surface 114 that is uninterrupted by any passages, openings, or slots. The inner race 72 further includes the axial bearing surface 112 on which the bearing member 76 is supported. The bearing surface 112 is a continuous uninterrupted circumferential surface disposed between the forward land 88 and that aft land 90. The example inner race 72 includes an axial width 116. The bearing member 76 is held axially between inner surfaces 126 of each of the lands 88, 90.

Figure 9:
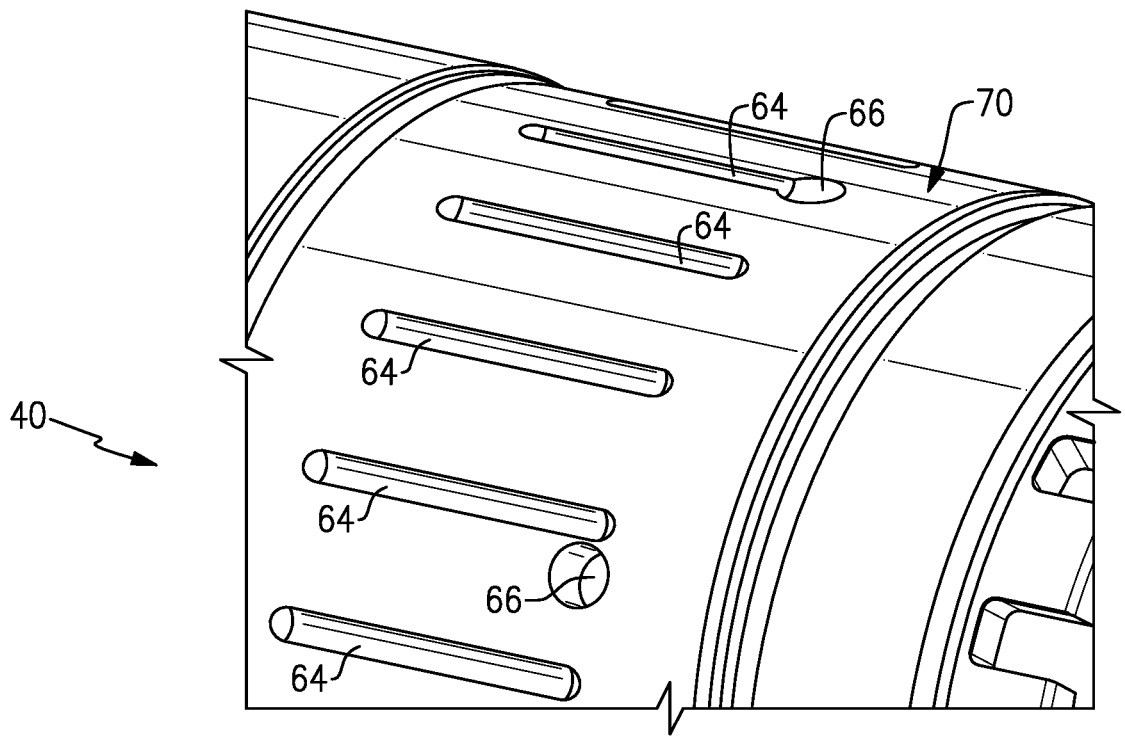
FIG. 9 is a side view of a portion of the example shaft.
Figure 10:
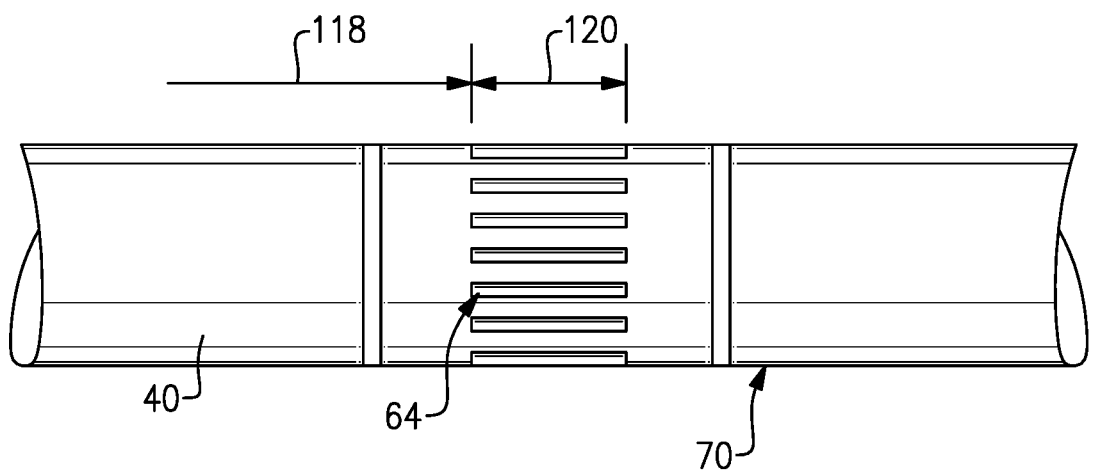
FIG. 10 is schematic view of a portion of an example shaft.

Referring to FIGS. 9 and 10 with continued reference to FIGS. 4, 7 and 8, the slots 64 on the outer surface 70 of the shaft 40 have an axial length 120. The axial length 120 of the slots 64 is greater than the axial width 116 of the inner race 72. The longer slots 64 provided for communication of lubricant to both the forward side 84 and the aft side 86 of the inner race 72, with momentary reference to FIG. 2.

The slots 64 begin at a common axial location schematically shown at 118 and are of a common length 120. The number of slots 64 are determined to provide communication of lubricant to each side of the inner race 72.

Passages 66 are arranged about the outer surface 70 of the shaft 40 and may or may not be aligned with one of the slots 64. The passages 66 provide a passage for lubricant from the inner cavity 68 to the outer surface 70. Lubricant on the outer surface 70 is communicated into both the slots 64 formed in the shaft 40 and the grooves 108 formed in the first and second covers 80, 82, with momentary reference to FIG. 2.

Referring to FIGS. 2 and 4, an operational embodiment includes the communication of lubricant 94 from a lubricant system 92 into the inner cavity 68 of the shaft 40. The lubricant 94 is provided at a sufficient pressure that combined with radially outward forces drives lubricant through the passages 66 to the outer surface 70 of the shaft 40. Lubricant is then communicated circumferentially about the outer surface 70 of the shaft 40 and into both the slots 64 and the grooves 108. The slots 64 provide axially communication of lubricant to both sides of the inner race 72. The grooves 108 define radial passages for communicating lubricant flow radially outward between the sides 84 and 86 of the inner race 72. The grooves 108 extend radially outward to the passage 110 defined by a spacing between the top portion 106 of each cover 80, 82 and the corresponding upper portions 100 on each side 84, 86 of the inner race 72.

Lubricant is sprayed or ejected radially outward against the bearing member 76. Lubricant contacting the spinning, rotating bearing member 76 is communicated and drawn into the contact surfaces. The bearing contact surfaces include the interface between the bearing member 76 and the fixed outer race 74, the bearing surface 112 and the axial inner surface 126 of a corresponding one of the forward and aft lands 88, 90.

Lubricant continues radially outward to lubricant other features surrounding the bearing member 76 and is eventually exhausted radially outward and directed to a gutter system that communicates lubricant back to the lubrication system 92 for recirculation.

Accordingly, the example bearing assembly 62 provides inner race with uniform stiffness that eliminates areas of stress concentration. Moreover, the covers abutting the inner race provide effective communication of lubricant to bearing surfaces without passages through the inner race that provides effective cooling and lubrication.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
    a shaft rotatable about an engine axis, the shaft includes slots formed on an outer surface and passages between an inner cavity to the outer surface; and
    a bearing assembly configured to support rotation of the shaft, the bearing assembly including an inner race supported on the outer surface of the shaft over the slots, at least one bearing member supported in the inner race, an outer race, a first cover disposed on a forward side of the inner race and a second cover disposed on an aft side of the inner race, wherein each of the first cover and the second cover include radially extending grooves for communicating lubricant from the slots to the bearing member, the slots formed on the outer surface of the shaft have an axial length that is greater than an axial width of the inner race, are circumferentially spaced apart, begin at a common axial location and are of a common axial length.

2. The turbine engine assembly as recited in claim 1, wherein the inner race includes a forward land and an aft land and the bearing member is disposed between the forward land and the aft land of the inner race.

3. The turbine engine assembly as recited in claim 2, wherein the inner race includes a bearing surface disposed between the forward land and the aft land, the bearing surface comprises a continuous uninterrupted circumferential surface.

4. The turbine engine assembly as recited in claim 2, wherein the inner race includes an inner circumferential surface that is disposed over the slots on the shaft, wherein the inner circumferential surface is uninterrupted.

5. A turbine engine assembly comprising:
    a shaft rotatable about an engine axis, the shaft includes slots formed on an outer surface and passages between an inner cavity to the outer surface; and
    a bearing assembly configured to support rotation of the shaft, the bearing assembly including an inner race supported on the outer surface of the shaft over the slots, at least one bearing member supported in the inner race, an outer race, a first cover disposed on a forward side of the inner race and a second cover disposed on an aft side of the inner race, wherein each of the first cover and the second cover include radially extending grooves for communicating lubricant from the slots to the bearing member, the inner race includes a forward land and an aft land, the bearing member is disposed between the forward land and the aft land of the inner race, and the forward side and the aft side of the inner race include a lower portion transverse to the outer surface of the shaft and an upper portion that is angled inward toward the bearing member.

6. The turbine engine assembly as recited in claim 5, wherein each of the first cover and the second cover include a bottom portion abutted against the corresponding lower portion of the forward side and the aft side and a top portion, wherein a spacing between the top portion of the first and second covers and a corresponding upper portion of the forward and aft sides of the inner race provides for communication of lubricant from the radially extending grooves toward the bearing member.

7. The turbine engine as recited in claim 1, wherein each of the first cover and the second cover overlap a portion of the slots or a portion of the passages between the inner cavity and the outer surface.

8. The turbine engine as recited in claim 1, including a fastening member securable to the shaft for holding the bearing assembly at an axial location on the outer surface of the shaft.

9. The turbine engine as recited in claim 1, including a lubrication system configured to communicate lubricant to the inner cavity of the shaft.

10. A gas turbine engine comprising:
    a fan including a plurality of fan blades rotatable about an axis;
    a compressor section;
    a combustor in fluid communication with the compressor section;
    a turbine section in fluid communication with the combustor;
    a shaft coupling a portion of the turbine section to at least one of the fan and a portion of the compressor section, the shaft including slots formed on an outer surface and passages between an inner cavity and the outer surface;
    a bearing assembly configured to support rotation of the shaft, the bearing assembly including an inner race supported on the outer surface of the shaft over the slots, at least one bearing member supported in the inner race, an outer race, a first cover disposed on a forward side of the inner race and a second cover disposed on an aft side of the inner race, wherein each of the first cover and the second cover include radially extending grooves for communicating lubricant from the slots to the bearing member, the slots formed on the outer surface of the shaft have an axial length that is greater than an axial width of the inner race, are circumferentially spaced apart, begin at a common axial location, and are of a common axial length; and
    a lubrication system communicating a lubricant flow to the bearing assembly through the inner cavity of the shaft.

11. The turbine engine assembly as recited in claim 10, wherein the inner race includes a forward land and an aft land and the bearing member is disposed between the forward land and the aft land of the inner race.

12. The turbine engine assembly as recited in claim 11, wherein the inner race includes a bearing surface disposed between the forward land and the aft land and an inner circumferential surface that is disposed over the slots on the shaft, and wherein each of the bearing surface and the inner circumferential surface comprise continuous uninterrupted circumferential surfaces.

13. The turbine engine assembly as recited in claim 12, wherein each of the first cover and the second cover include a bottom portion abutted against the corresponding one of the forward side and the aft side of the inner race and a top portion spaced apart from the corresponding one of the forward side and the aft side to define a passage for communication of lubricant from the radially extending grooves toward the bearing member.

14. A bearing assembly for supporting a rotatable shaft of an aircraft engine comprising:
   an inner race configured for assembly over slots formed on an outer surface of a shaft;
   at least one bearing member supported in the inner race;
   an outer race configured for assembly to an engine static structure;
   a first cover disposed on a forward side of the inner race; and
   a second cover disposed on an aft side of the inner race, wherein each of the first cover and the second cover include radially extending grooves defining a portion of a lubricant pathway to the bearing member, a bottom portion abutted against the corresponding one of the forward side and the aft side of the inner race and a top portion spaced apart from the corresponding one of the forward side and the aft side to define a passage for communication of lubricant from the radially extending grooves toward the bearing member.

15. The bearing member as recited in claim 14, wherein the inner race includes a bearing surface disposed between a forward land and an aft land and an inner circumferential surface, and wherein each of the bearing surface and the inner circumferential surface comprise continuous uninterrupted circumferential surfaces.

\* \* \* \* \*